United States Patent
Sugita

(10) Patent No.: US 9,864,161 B2
(45) Date of Patent: Jan. 9, 2018

(54) LENS BARREL AND OPTICAL APPARATUS HAVING THE SAME

(71) Applicant: CANON KABUSHIKI KAISHA, Tokyo (JP)

(72) Inventor: Jun Sugita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/619,313

(22) Filed: Feb. 11, 2015

(65) Prior Publication Data

US 2015/0226933 A1    Aug. 13, 2015

(30) Foreign Application Priority Data

Feb. 13, 2014    (JP) ................... 2014-025273

(51) Int. Cl.
     *G02B 7/02*      (2006.01)

(52) U.S. Cl.
     CPC ............ *G02B 7/028* (2013.01); *G02B 7/021* (2013.01); *G02B 7/026* (2013.01)

(58) Field of Classification Search
     CPC .......... G02B 7/04; G02B 7/023; G02B 7/026; G03B 5/00
     USPC ................................................ 359/811–830
     See application file for complete search history.

(56) References Cited

U.S. PATENT DOCUMENTS

| | | | |
|---|---|---|---|
| 5,052,782 A * | 10/1991 | Myer | G02B 7/026 359/694 |
| 7,185,992 B2 | 3/2007 | Yoshizawa | |
| 7,244,026 B1 * | 7/2007 | Ross, III | A61B 3/125 351/205 |
| 9,235,107 B2 * | 1/2016 | Han | G02B 7/02 |
| 2002/0135898 A1 * | 9/2002 | Nomura | G02B 7/102 359/819 |
| 2005/0122600 A1 | 6/2005 | Yoshizawa | |
| 2009/0244734 A1 * | 10/2009 | Sasaki | G02B 7/026 359/830 |
| 2010/0282725 A1 * | 11/2010 | Johnson | B23K 26/0648 219/121.67 |
| 2014/0002676 A1 * | 1/2014 | Ning | G02B 7/14 348/187 |

FOREIGN PATENT DOCUMENTS

| | | |
|---|---|---|
| JP | 58043407 A | 3/1983 |
| JP | 05127058 A | 5/1993 |
| JP | 07209567 A | 8/1995 |

(Continued)

OTHER PUBLICATIONS

Office Action issued in JP2014-025273, dated Dec. 22, 2015.

*Primary Examiner* — Mahidere Sahle
(74) *Attorney, Agent, or Firm* — Rossi, Kimms & McDowell LLP

(57) ABSTRACT

A lens barrel includes an optical element, a barrel body configured to hold the optical element, the barrel body including a female thread, a presser including a male thread fastened to the female part and contacting the optical element, and an elastic member held by the presser, wherein in a fastening state in which the male thread is fastened to the female thread, both the presser and the elastic member contact the optical element, and the elastic member applies a force in a direction of fixing the optical element onto the barrel body.

17 Claims, 4 Drawing Sheets

(56) References Cited

FOREIGN PATENT DOCUMENTS

| JP | 2003195137 A | 7/2003 |
|----|--------------|--------|
| JP | 2005148254 A | 6/2005 |
| JP | 2010085715 A | 4/2010 |

* cited by examiner

LENS BARREL AND OPTICAL APPARATUS HAVING THE SAME

BACKGROUND OF THE INVENTION

Field of the Invention

The present invention relates to a lens barrel.

Description of the Related Art

In mounting an optical element in a lens barrel, an optical axis adjustment is often necessary in which an optical axis of the optical element is accorded with a center axis of a barrel body so as to maintain the optical performance. Japanese Patent Laid-Open No. ("JP") 07-209567 provides an optical element with an inclined surface that contacts a barrel body, and arranges a contact member on the barrel body, which has an inclined surface and slides relative to the optical element via an elastic member. JP 2005-148254 proposes a press ring that holds an elastic member and supports glass. JP 05-127058 proposes a presser holds an optical element via an elastic member.

However, the configuration disclosed in JP 07-209567 is not suitable for the lens barrel that requires a highly precise maintenance of the optical axis below the engagement error between the barrel and the contact member, and this problem becomes remarkable in a high temperature environment due to the thermal expansion difference between the materials. Neither the press ring disclosed in JP 2005-148254 nor the presser disclosed in JP 05-127058 serves to align a center of the optical element with the barrel.

SUMMARY OF THE INVENTION

The present invention provides a lens barrel that can provide an optical axis adjustment that accords an optical axis of an optical element with a center axis of a barrel body and can stably hold the optical element having the adjusted optical axis even in a high temperature environment.

A lens barrel according to the present invention includes an optical element, a barrel body configured to hold the optical element, the barrel body including a female thread, a presser including a male thread fastened to the female part and contacting the optical element, and an elastic member held by the presser, wherein in a fastening state in which the male thread is fastened to the female thread, both the presser and the elastic member contact the optical element, and the elastic member applies a force in a direction of fixing the optical element onto the barrel body.

Further features of the present invention will become apparent from the following description of exemplary embodiments with reference to the attached drawings.

DESCRIPTION OF THE EMBODIMENTS

Figure 1:
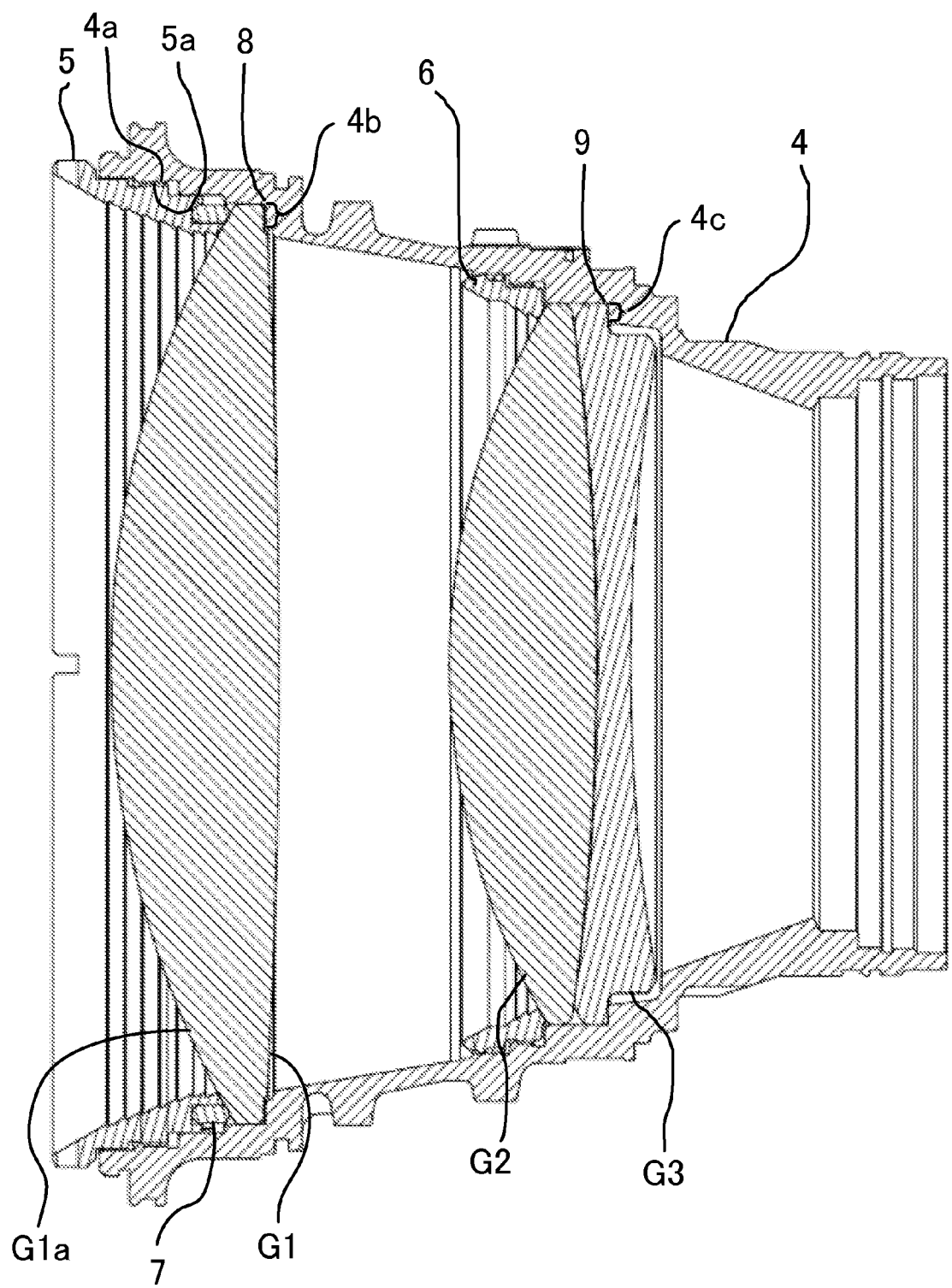
FIG. 1 is a sectional view of a lens barrel according to this embodiment.
Figure 2:
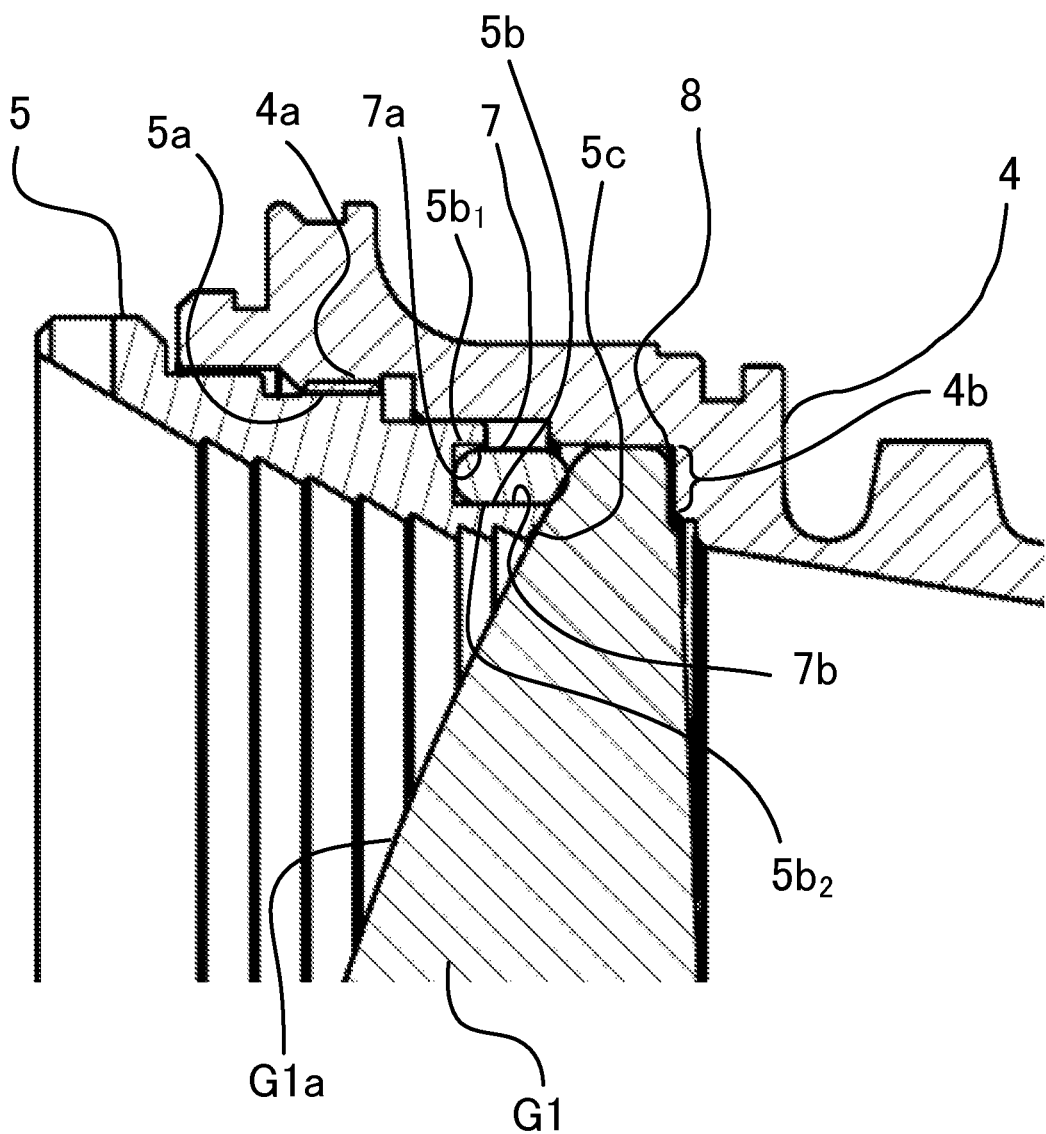
FIG. 2 is a partially enlarged sectional view illustrated in FIG. 1.
Figure 3:
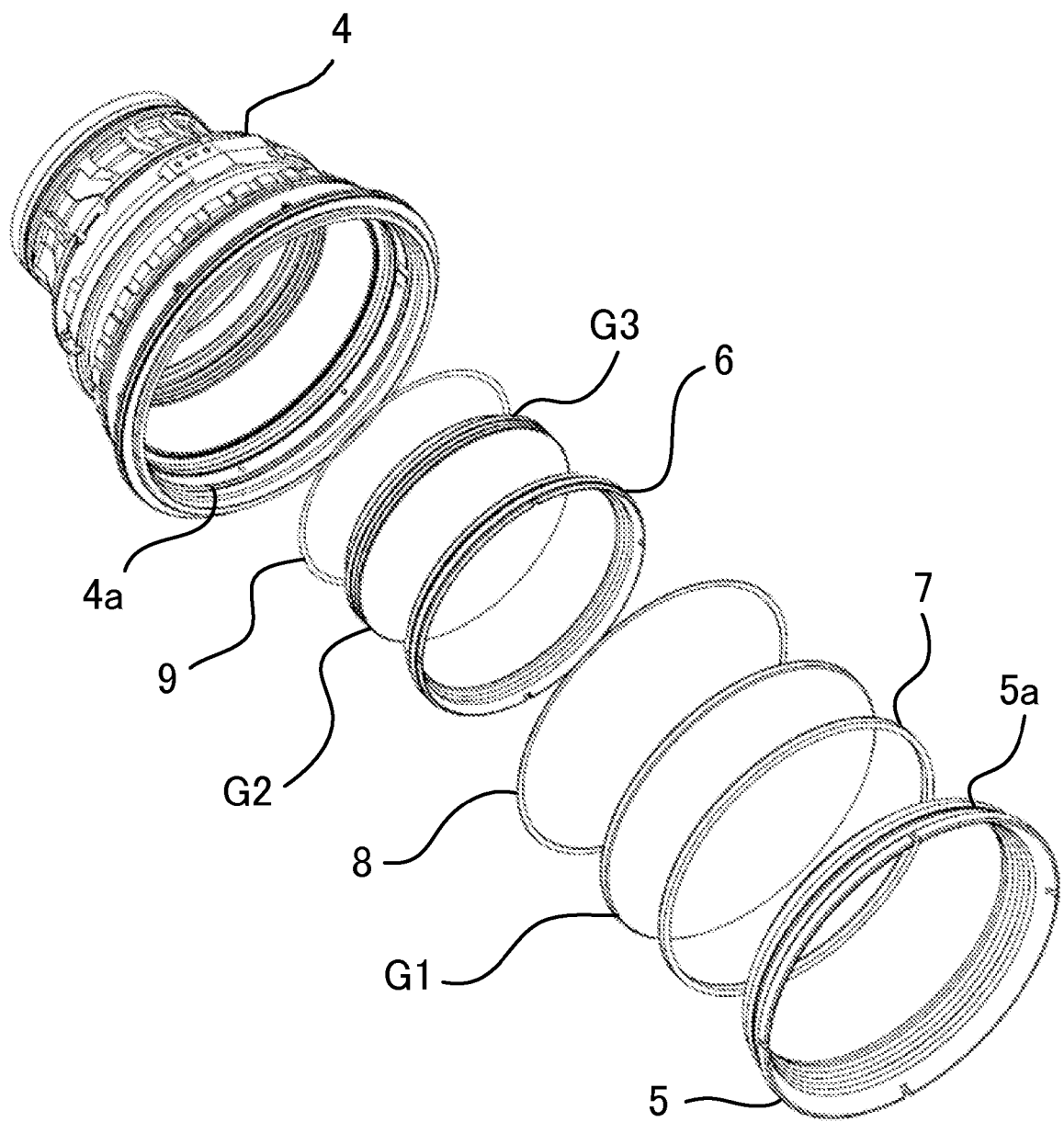
FIG. 3 is an exploded perspective view of a lens barrel illustrated in FIG. 1.

FIG. 1 is a sectional view of a lens barrel according to this embodiment. FIG. 2 is a partially enlarged sectional view of FIG. 1. FIG. 3 is an exploded perspective view of the lens barrel illustrated in FIG. 1.

The lens barrel holds an optical system that includes optical elements G1, G2, and G3, and can be attached to and detached from a camera body (or image-pickup apparatus body) (not illustrated). In this case, the optical system serves as an image-pickup optical system configured to form an optical image of an object. The lens barrel may be integrated with the camera body. The image-pickup apparatus may be a digital still camera or a digital video camera. Moreover, the present invention is applicable to an optical apparatus, such as binoculars, a microscope, a measuring apparatus, and a laser.

In FIGS. 1 to 3, the optical elements G1, G2, and G3 are made of a transparent material, such as glass. In this embodiment, the optical element G1 is a convex lens, the optical element G2 is a convex lens, and the optical element G3 is a concave lens. In the following description, a curved surface on the incident side of the object light of the optical element G1 may be referred to as an "R1 curvature surface G1a." The optical element G1 has a curved surface, an inclined surface, or a plane on the incident side of the object light.

A structure that guarantees an interval between optical elements by bringing surfaces of the optical elements into contact outside their effective diameters is generally referred to as a "marginal contact," and an area in which the two optical elements contact each other is referred to as a "marginal point." A lens fixing method that mounts and fixes a plurality of marginally contacted optical elements together into the barrel is known, and the optical elements G2 and G3 contact each other by the marginal contact.

Reference numeral 4 denotes a (barrel) body of the lens barrel configured to hold each optical element, and the barrel body 4 is made of a metal or resin material. As illustrated in FIG. 2, the barrel body 4 includes a female thread 4a, a support 4b, and a support 4c. The female thread 4a is a threaded portion formed onto an inner circumference on part of a cylindrical or conical inner surface. The support 4b is a plane perpendicular to the optical axis, and supports (part) of the optical element G1 via a G1 sheet 8, which will be described later. The support 4c is a plane perpendicular to the optical axis and supports (part) of the optical element G3 via a G3 sheet 9, which will be described later. Nevertheless, the present invention allows the supports 4b and 4c to be inclined surfaces.

Reference numeral 5 denotes a first press ring (presser) configured to contact the optical element G1 and to fix the optical element G1 into the barrel body 4. The first press ring 5 includes a male thread 5a, an elastic member holder 5b, and a contact area 5c. The first press ring 5 may not have an annular shape that contacts the optical element G1 over its circumference, and may have an annular shape that partially contacts the optical element G1 or three components that contact the optical element G1 at 120° intervals.

The male thread 5a is a threaded portion formed onto the outer circumference on part of a cylindrical or conical outer surface of the first press ring 5. When the male thread 5a is fastened with the female thread 4a, the first press ring 5 is fixed and held into the barrel body 4. At this time, the center of the first press ring 5 is aligned with the center of the barrel body 4.

The elastic member holder 5b is formed on an outer surface of the first press ring 5, and holds the annular elastic member (elastic member) 7. In this embodiment, the elastic member holder 5b is an annular groove (concave) formed over the outer circumference on the outer surface of the first press ring 5. Since the annular elastic member holder 5b has an annular or torus groove shape, the annular elastic member 7 can be restrained from deforming to the outer circumferential direction. However, the annular elastic member holder 5b does not have to be formed over the circumference.

In the section containing the optical axis (not illustrated) in the optical system illustrated in FIG. 2, the elastic member holder 5b has a contact surface $5b_1$ that can contact the outer (circumference) surface of the annular elastic member 7, and a contact surface $5b_2$ that can contact the inner (circumference) surface of the annular elastic member 7, and holds the annular elastic member 7 by the contact surfaces $5b_1$ and $5b_2$.

In a fastening state in which the male thread 5a is fastened to the female thread 4a, both the first press ring 5 and the annular elastic member 7 contact the optical element.

The contact area 5c is an end surface of the first press ring 5c on the side of the optical element G1, and maintains the planeness. In the fastening state, the contact area 5c (first press ring 5) contacts the optical element G1, and provides an optical axis adjustment of the optical element G1.

Reference numeral 6 denotes a similarly screwed second press ring configured to hold the optical elements G2 and G3 together.

The annular elastic member 7 does not have to possess an annular shape that contacts the optical element G1 over the circumference, and may be an annular shape that partially contacts the optical element G1, or three elastic members that contact the optical element G1 at 120° intervals.

The annular elastic member 7 has an elliptical shape in which a length in the optical axis direction is longer than a thickness in the diameter direction. The annular elastic member 7 is long in the optical axis direction enough to be stably held in the press ring 5. Hence, a fixation of the annular elastic member 7 becomes easier than a fixation when the annular elastic member 7 has of a circular section. The annular elastic member 7 contacts the R1 curvature surface G1a of the optical element G1 outside the area where the contact area 5c contacts the optical element G1.

The annular elastic member 7 projects further than the contact area 5c toward the optical element G1, and presses the optical element G1 against the support 4b of the barrel body 4. In other words, the annular elastic member 7 applies a force in a direction of fixing the optical element G1 onto the barrel body 4.

The annular elastic member 7 continues to contact the optical element G1 and continues to apply the force in the fastening state after the optical axis adjustment even when at least part of the contact area 5c is separated from the optical element G1, thereby maintaining an orientation of the optical element G1 and maintaining the center aligning precision.

The annular elastic member 7 is made of a material having a self-lubrication function, such as silicon rubber, and its friction with the contact counterpart is low. Due to the low friction when the annular elastic member 7 contacts the optical element G1, the male thread 5a of the first press ring 5 is smoothly rotated and fastened to the female thread 4a of the barrel body 4 with a smaller power.

The annular G1 sheet 8 is arranged between the support 4b of the barrel body 4 and the optical element G1, and made of a low-friction material, such as resin and PTFE. The G1 sheet 8 serves to adjust a position of the optical element G1 in the optical axis direction, and has an annular shape. The G1 sheet 8 protects the optical element G1 from contacting the support 4b of the barrel body 4 and from getting damaged. Since the G1 sheet 8 is made of the low-friction material, the optical element G1 can smoothly slide on the G1 sheet 8.

Reference numeral 9 denotes an annular G3 sheet arranged between the support 4c of the barrel body 4 and the optical element 3, and is made of a low-friction material, such as resin and PTFE. The G3 sheet 9 serves to adjust positions of the optical elements G2 and G3 in the optical axis direction, and has an annular shape. The G3 sheet 9 protects the optical element G3 from contacting the support 4c of the barrel body 4 and from getting damaged. Since the G3 sheet 9 is made of a low-friction material, the optical element G3 can smoothly slide on the G3 sheet 9.

Next follows a description of a procedure of holding the optical elements G1 to G3 in the barrel body 4.

After the G3 sheet 9 and the optical elements G2 and G3 are inserted into the barrel body 4, the second press ring 6 is screwed with the barrel body 4. Thereby, the optical elements G2 and G3 are held in the barrel body 4.

JP 07-209567 cannot align centers with each other below the engagement error between the barrel and the contact member, and is not applicable to the lens barrel that needs a precise optical axis maintenance below the engagement error between the barrel and the contact member. In addition, for example, if the lens barrel assembled at a normal temperature of 20° C. is left in a high temperature environment at about 60° C., a press ring may float by about 10 μm due to a thermal expansion difference between the barrel material and the optical element material.

This embodiment can provide an optical axis adjustment of the optical element G1, and stably hold the optical element G1 having the adjusted optical axis under a high temperature environment.

Accordingly, the G1 sheet 8 and the optical element G1 are inserted into the barrel body 4, and the holder 5a of the first press ring 5 on which the annular elastic member 7 is held is fastened with the female thread 4a of the barrel body 4. This embodiment secures a center alignment of the male thread 5a relative to the female thread 4a through thread fastening, and no engagement error component occur. Next, the contact area 5c of the first press ring 5 contacts the R1 curvature surface G1a of the optical element G1, and thereby adjusts the optical axis of the optical element G1. Due to the G1 sheet 8 made of the low-friction material, the center alignment becomes easy.

In addition, the annular elastic member 7 contacts the R1 curvature surface G1a, and thereby the optical element G1 is pressed against and fixed onto the barrel body 4. At this time, the annular elastic member 7 has a self-lubrication property, and slides on the R1 curvature surface G1a when the first press ring 5 is rotated. As a result, the attachment of the first press ring 5 and the center alignment of the optical element G1 are not prevented.

Thereafter, the barrel body 4 is left under the high temperature environment. Assume that air gaps occur among the optical element G1, the barrel body 4, and the first press ring 5, due to the thermal expansion difference between the material of the barrel body 4 and the material of the optical element G1. For example, it is concerned that at least part of the contact area 5c separates from the R1 curvature surface G1a and the center alignment precision lowers. However, even when the contact area 5c separates from the R1 curvature surface G1a, the annular elastic member 7 continuously contacts the R1 curvature surface G1a and continuously presses it. In other words, even under the high temperature environment, the annular elastic member 7 fixes the optical element after the optical axis adjustment is performed, and maintains the center alignment precision that has been performed at a normal temperature.

When the barrel body 4 is made of a resin material, a thermal expansion difference between the optical element made of a glass material and the barrel body 4 becomes large and the effect of this embodiment becomes significant.

The annular elastic member 7 may be made of an elastic material, such as normal elastomer, and a lubrication coating process that provides a low friction may be performed after molding for the contact area with the optical element. This structure may also provide the lubrication function to the contact area with the optical element G1.

Figure 4:
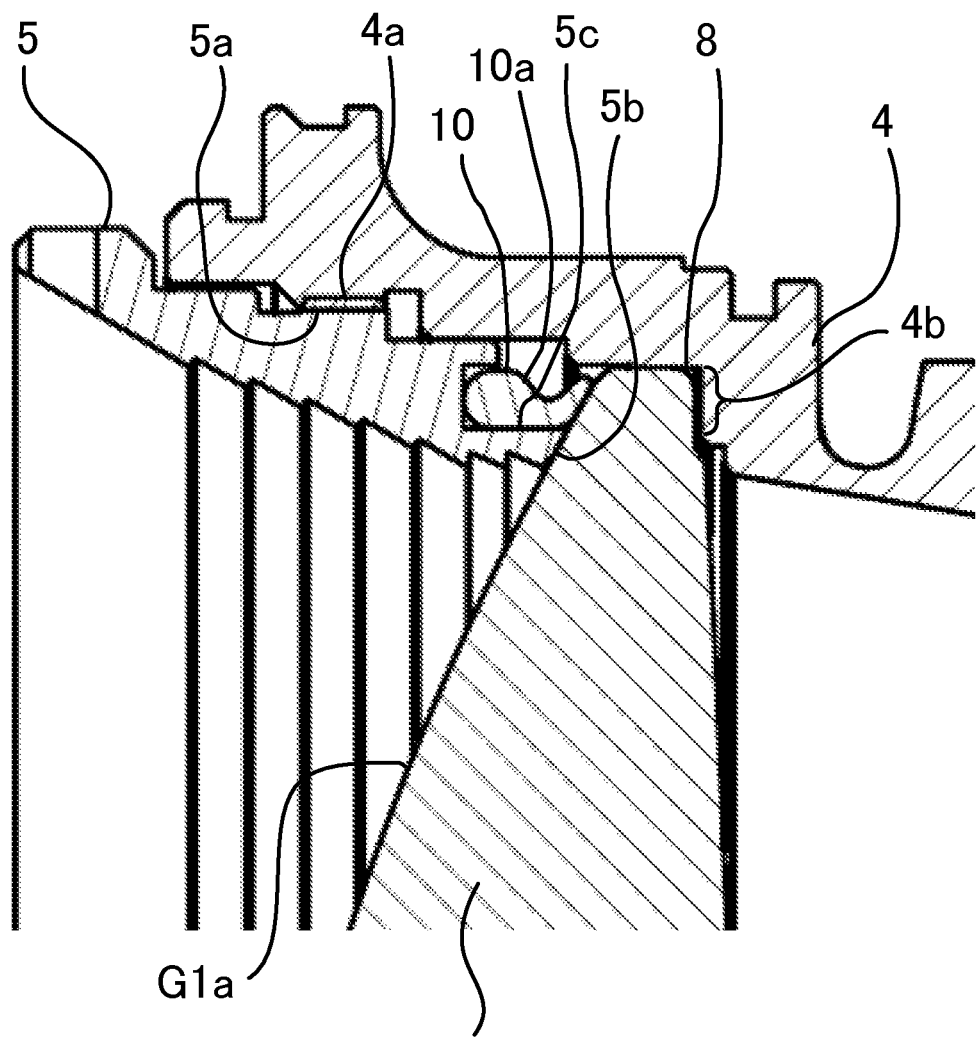
FIG. 4 is a partially enlarged sectional view of a modification of FIG. 2.

FIG. 4 is a sectional view illustrating a modification of FIG. 2. FIG. 4 is different from FIG. 2 in having an annular elastic member (elastic member) 10 instead of the annular elastic member 7. The annular elastic member 10 is different in shape from the annular elastic member 7.

The annular elastic member 10 is similar to the annular elastic member 7 in that the length in the optical axis direction is longer than the thickness in the diameter direction, but a width in the direction perpendicular to the optical axis changes on the section that contains the optical axis. The annular elastic member 10 becomes more likely to deform due to a thinned part 10a in the optical axis direction, and it is unnecessary to make the annular elastic member 10 of a rubber material as in the annular elastic member 7. For example, the annular elastic member 10 may be made of a resin material.

The shape illustrated in FIG. 4 can reduce a spring constant of the annular elastic member 10, and provide a more stable force the optical element G1 even when size scattering with other components is considered. Although the annular elastic member 10 is thinned on the outer circumference side on the section that contains the optical axis, it may be thinned on the inner circumference side or at a plurality of portions.

The lens barrel is applicable to the field of the optical apparatus.

The present invention provides a lens barrel that can provide an optical axis adjustment that accords an optical axis of an optical element with a center axis of a barrel body and can stably hold the optical element having the adjusted optical axis even in a high temperature environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The optical apparatus having the above lens barrel constitutes one aspect of the present invention.

This application claims the benefit of Japanese Patent Application No. 2014-025273, filed Feb. 13, 2014, which is hereby incorporated by reference herein in its entirety.

What is claimed is:

1. A lens barrel comprising:
   an optical element;
   a barrel body configured to hold the optical element, the barrel body including a female thread;
   a presser including a male thread fastened to the female thread; and
   an elastic member held by the presser and configured to press the optical element to the barrel body,
   wherein a length of the elastic member in an optical axis direction is longer than a thickness of the elastic member in a diameter direction, and
   wherein, in a fastening state where the male thread is fastened to the female thread, both the presser and the elastic member can contact a predetermined curved surface of the optical element.

2. The lens barrel according to claim 1,
   wherein, in the fastening state, the presser can contact the optical element and provide an optical axis adjustment of the optical element, and the elastic member continues to contact the optical element and continues to apply the force in the fastening state after the optical axis adjustment even when at least part of the presser is separated from the optical element.

3. The lens barrel according to claim 1, wherein the presser has an annular shape.

4. The lens barrel according to claim 1, wherein the elastic member has an annular shape.

5. The lens barrel according to claim 1, wherein the presser has a groove configured to hold the elastic member so as to sandwich an outer surface and an inner surface of the elastic member.

6. The lens barrel according to claim 1,
   wherein the barrel body includes a support configured to support the optical element, and
   wherein the lens barrel further comprises a sheet arranged between the support and the optical element, the optical element being slidable on the sheet.

7. The lens barrel according to claim 6, wherein the sheet has an annular shape.

8. The lens barrel according to claim 1, wherein the elastic member has a lubrication function at an area that contacts the optical element.

9. The lens barrel according to claim 1, wherein the elastic member changes a width in a direction perpendicular to the optical axis on a section that contains the optical axis.

10. An optical apparatus comprising a lens barrel that includes an optical element, a barrel body configured to hold the optical element, the barrel body including a female thread, a presser including a male thread fastened to the female thread, and an elastic member held by the presser and configured to press the optical element to the barrel body,
    wherein a length of the elastic member in an optical axis direction is longer than a thickness of the elastic member in a diameter direction, and
    wherein, in a fastening state where the male thread is fastened to the female thread, both the presser and the elastic member contact a predetermined curved surface of the optical element.

11. The lens barrel according to claim 1, wherein the presser only contacts an area of the predetermined curved surface that is located closer to the optical axis side than another area of the predetermined curved surface that the elastic member contacts.

12. The lens barrel according to claim 1,
    wherein the barrel body includes a support configured to support the optical element, and
    wherein a surface of the optical element on a side opposite to a side where the presser and the elastic member are disposed when viewed from the optical element is supported by only the support.

13. The lens barrel according to claim 1,
    wherein the barrel body includes a support configured to support the optical element, and
    wherein the presser and the elastic member contact a first surface of the optical element on a side opposite to a second surface of the optical element supported by the support.

14. The lens barrel according to claim 1, wherein the barrel body includes a support configured to support the optical element.

15. The lens barrel according to claim 14, wherein the support includes a plane perpendicular to an optical axis of the optical element.

16. The lens barrel according to claim 14, wherein the elastic member is configured to press the optical element to the support.

17. The lens barrel according to claim 1,
wherein, in the fastening state, the elastic member continues to contact the predetermined curved surface even when at least a part of the presser separates from the predetermined curved surface.

* * * * *